United States Patent [19]

McCrae

[11] 4,184,202
[45] Jan. 15, 1980

[54] BIORHYTHM COMPUTER

[75] Inventor: Ian S. McCrae, Atlanta, Ga.

[73] Assignee: Kosmos International Ltd., Nassau, The Bahamas

[21] Appl. No.: 880,046

[22] Filed: Feb. 22, 1978

[30] Foreign Application Priority Data

May 21, 1977 [JP] Japan .................................. 52-59273

[51] Int. Cl.² ........................ G06F 15/02; G06F 15/42
[52] U.S. Cl. .................................... 364/413; 364/710; 364/715
[58] Field of Search ................ 364/413, 705, 715, 710

[56] References Cited

U.S. PATENT DOCUMENTS

| 4,055,749 | 10/1977 | Kraushaar | 235/92 PE |
| 4,101,962 | 7/1978 | Hakata | 364/413 |

OTHER PUBLICATIONS

"HP-65 Users' Library Catalog of Contributed Programs", Sep. 1974.
G. J. Munsey, "Biorhythms", HP-65 Contributed Program Number 00284A.
R. H. Shudde, "Biorhythm-Biological Cycles", HP-65 Contributed Program Number 00360A.

*Primary Examiner*—Jerry Smith
*Attorney, Agent, or Firm*—Jones, Thomas & Askew

[57] ABSTRACT

A minicomputer is provided with special function keys for computing biorhythms and the biorhythmic compatability of two individuals. Display means for displaying, unambiguously, the biorhythm computed by the computer. Signal indicia indicate when one or more of the biorhythm cycles as computed by the computer, are at a critical or minicritical stage.

4 Claims, 10 Drawing Figures

Fig_2

Fig_1

BIORHYTHM COMPUTER

BACKGROUND

1. Field of the Invention

The present invention relates to a biorhythm computer which will quickly calculate and display the biorhythms of a person on any given day, if that person's birthdate is known.

Research in the human biorhythms began in the early part of this century and the biorhythm theory postulates that there are certain metabolic rhythms that have a constant cycle time in the human body. The biorhythms have been identified as a 23-day cycle related to physical vitality, endurance and energy (hereinafter P cycle); a 28-day cycle that corresponds to sensitivity, intuition and emotional outlook (hereinafter S cycle); and a 33-day cognitive or intellectual cycle that relates to mental alertness and judgment (hereinafter I cycle). The biorhythm theory further postulates that all three cycles start upward and positive direction from birth and continue with the aforementioned periodicity throughout a person's life.

Research in this field has indicated that for each cycle, there are "critical days". These critical days occur for a particular cycle when that cycle is making a transition from positive to negative or negative to positive. It has been found that humans will lack endurance and energy on critical days of their P cycle, and are more likely to have accidents or make poor decisions on critical days of their S and I cycles.

More recently the use of biorhythm computations has gained wide popularity in health controls, sporting programs and public transportation. For instance, the biorhythm is widely used in Japan to make sure that drivers of public transportation vehicles and airline pilots do not work on days on which their S and I cycles are in a critical period. Likewise it has been found that key "upsets" in sporting events involving individual athletes have occurred when the expected winner was experiencing a critical day in one or more of his or her biorhythm cycles.

Since each biorhythm cycle has a different period, the calculations of a person's biorhythms can be complex and time consuming. Thus it is desirable that a quick and simple apparatus for calculating biorhythms for any person on any particular day be provided. Furthermore it is desirable to test the compatibility of persons who must work together and cooperate on various projects and assignments. It has been found that, for instance, two persons with similar biorhythm cycles perform much better as a team than those whose biorythm cycles show a large discrepancy.

2. Description of Prior Art

In the prior art it has been possible to program general purpose digital computers to compute human biorhythms. With the advent of programmable hand-held calculators, it has further been possible to pre-program hand-held calculators which will compute human biorrhythms.

However the prior art does not disclose a biorhythm computer which displays all three biorhythms for a particular individual on a particular day simultaneously wherein the numerical representation of each biorhythm is separated from the others by separation indicia such as decimal points, commas, dashes, etc. This is because prior art general purpose hand-held programmable calculators are constructed so that their display of figures will conform to ordinary mathematical conventions. Thus, prior art calculators will provide only one decimal point in their display means at any one time. Likewise, prior art programmable calculators will provide blank spaces between digits in the display only when the digits to the right of the blank space represent exponents.

The prior art does not disclose a calculator which will provide appropriate visual or audio indicia that the biorhythms calculated contain a critical or minicritical day for a certain cycle or cycles that can be displayed simultaneously with the numerical value of the three biorhythms. Thus, with prior art calculators, determination of the existence of critical or minicritical days may be had only by reference to an external table or chart, or by committing to memory on what days of each cycle, such critical and minicritical days occur.

SUMMARY OF THE INVENTION

It is an object of this invention to provide a calculator which, given the inputs of birthdate of the subject, and day of interest, will calculate at what point in the P, S, and I biorhythm cycles the subject is on that particular date.

It is a further object of this invention to provide a biorhythm calculator with a specialized keyboard such that once the dates of interest are entered into the calculator memory, the biorhythms related to the two dates may be calculated by a single key stroke.

It is a further object of this invention to provide a biorhythm calculator which will display the numerical value of each biorhythm simultaneously and with appropriate separation indicia so that the user may easily ascertain the values.

It is a further object of this invention to provide a biorhythm calculator which provides signal indicia indicating that one of the calculated biorhythms is at a critical or minicritical day.

It is a further object of this invention to provide a calculator which will display a visual indication of which day of the week corresponding to any date displayed on the calculator readout.

It is still a further object of this invention to provide a biorhythm calculator which will calculate the biorhythmic compatibility of two persons and display said biorhythmic compatibility for the three biorhythm cycles simultaneously, expressed as compatibility percentages and separated by appropriate separation indicia.

BRIEF DESCRIPTION OF THE DRAWINGS

FIG. 4 comprising

FIG. 6 comprising

DESCRIPTION OF THE PREFERRED EMBODIMENT

Figure 1:
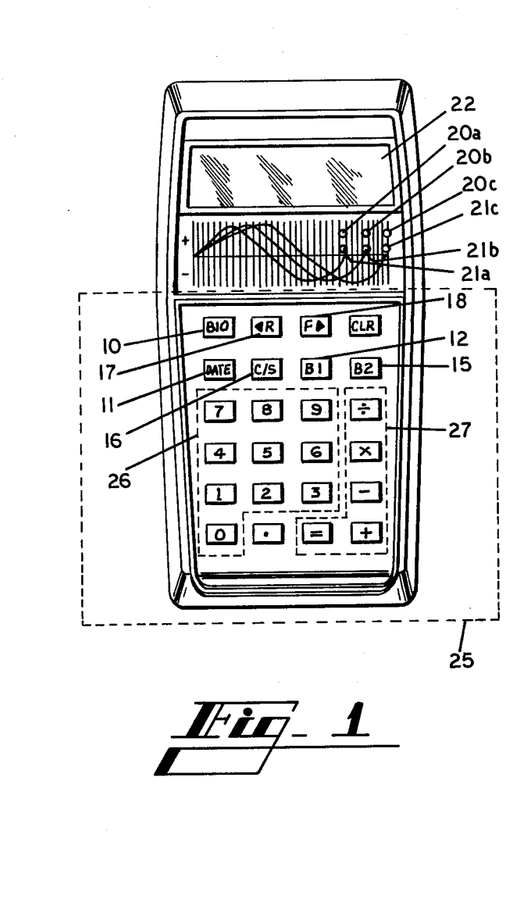
FIG. 1 is a plan view of the face of a preferred embodiment of the present invention.

FIG. 1 shows the front of the preferred embodiment of the invention disclosed herein. The normal keyboard 25 comprising numerical keys shown as 26 and conventional algebraic function keys shown as 27. As may be ascertained from observation of the keyboard, the preferred embodiment of the present invention includes the capability of serving as a conventional four-function calculator in addition to the novel inventive features related to computation of biorhythms disclosed herein. Keyboard 25 further includes the special function keys 10, 11, 12, 15, 16, 17 and 18. Critical and minicritical indicia lights in the preferred embodiment are light-emitting diodes. The critical signal lights 20A–20C are red and are illuminated when a calculated biorhythm is such that a critical day in a particular cycle has been detected. Minicritical signal lights 21A–21C are amber colored in the preferred embodiment and light when the calculated biorhythm indicates that a minicritical day in the particular cycle has been computed. Minicritical days are days in which the biorhythm in question is at a positive or negative peak value.

Figure 2:
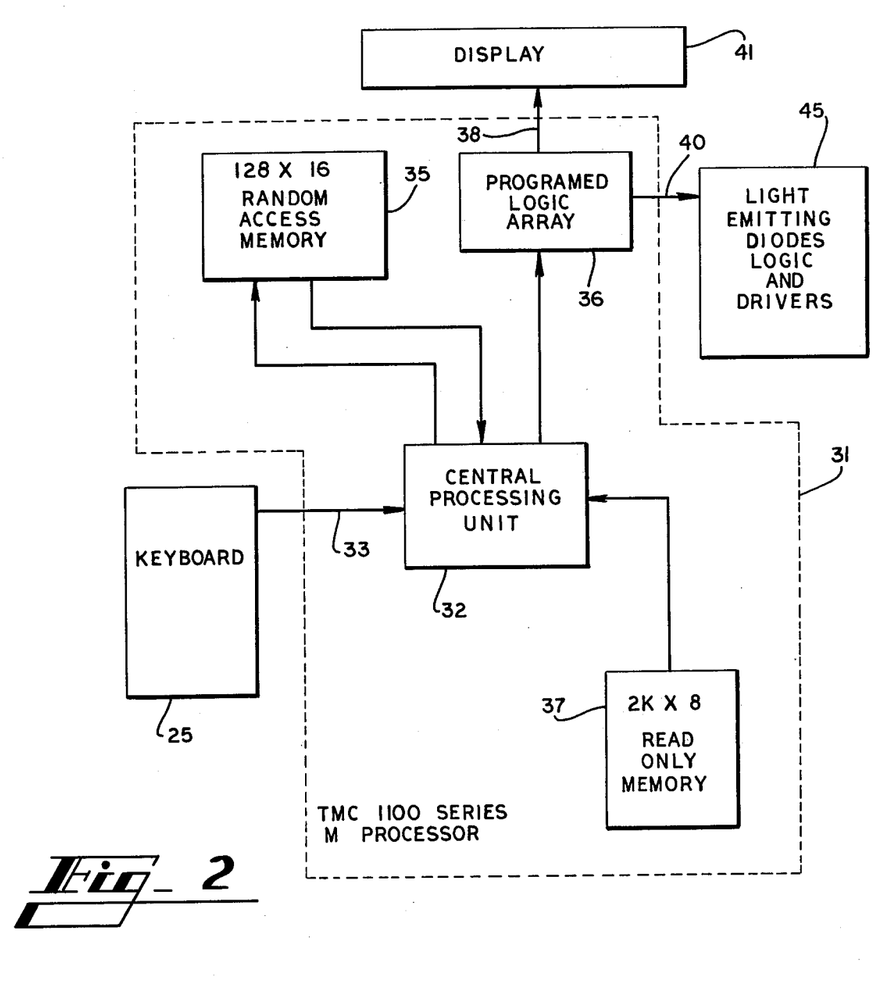
FIG. 2 is a block diagram of a preferred embodiments of the present invention.

Turning now to FIG. 2 it can be seen that the present invention is built around a microprocessor. The preferred embodiment of this invention uses a Texas Instrument Company 1100 Series microprocessor 31. As is known to those skilled in the art, such microprocessors comprise a central processing unit 32, random access memory 35, programmable logic array 36, and read only memory 37. Given the algorihthm disclosed herein, a person of ordinary skill in the art will be able to select appropriate machine instructions to be written into read only memory 37 to implement the numerical calculations of the biorhythms. Various registers referred to in this specification will be located at distinct addresses in random access memory 35. It is a matter of programmer choice as to what address corresponds to what register.

As is shown schematically in FIG. 2, keyboard 25 is connected to microprocessor 31 by multiconductor cable 33. Display 41 is interconnected with microprocessor 31 by means of cable 38. Cable 38 is likewise interconnected with programmable logic array 36 by various internal connections in microprocessor 31. It will be understood by those skilled in the art that cable 38 represents multiple conductors connecting microprocessor 31 to display 41. Cable 40 shown in FIG. 2 connects programmable logic array 36 with light-emitting diodes logic and drivers 45 which, in the preferred embodiment serve as critical and minicritical signal indicia.

Figure 3:
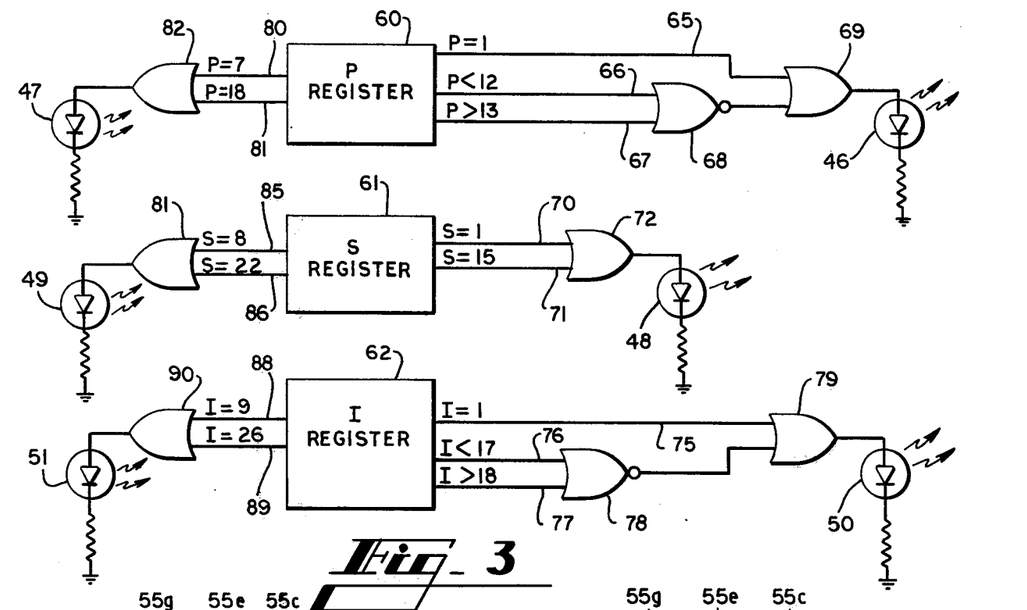
FIG. 3 is a schematic representation of the logic driving the critical and minicritical signal indicia in the preferred embodiment of the present invention.

FIG. 3 is a schematic representation of the logic whereby light-emitting diodes 46–51 are operated. P register 60 represents the address location in RAM 35 where a calculated value of the P biorhythm cycle is stored upon completion of the biorhythm calculation. Emanating from P register 60 are lines 65, 66, 67, 80, and 81 with the mathematical values of the number contained in the P register which causes them to be in a logical one state written thereon. It will be understood by those skilled in the art that these logic outputs may be hard wired from the appropriate address of random access memory 35 or may be implemented by sequential testing of the value of the number found in P register 60, where said sequential testing is performed by CPU 32. The values obtained by testing P register 60 which appear on line 65, 66, 67, 80 and 81, are subject to certain boolean operations which provide one of the novel features of the present invention. As can be seen from FIG. 3 if the value of the P cycle contained in P register 60 is equal to one, line 65 is in its logical one state and the output of OR gate 69 is driven to a logical one state. The other input to OR gate 69 is the output or NOR gate 68 which is driven to a logical one state whenever the contents of P register 60 are equal to 12 or 13. Thus it can be seen that the output of OR gate 69 turns on LED 46 when the value of the calculated physical biorhythm cycle is equal to 1, 12, or 13. As explained above these are critical days in the P biorhythm cycle. LED 46 manifests itself as P cycle critical day indicator 20A on the face of the biorhythm calculator as shown in FIG. 1.

Similarly the output of OR gate 82 goes to a logical one state when the value of the physical biorhythm cycle is either 7 or 18, the days when that cycle is at a peak positive or peak negative value. The output of OR gate 82 turns on LED 47 which manifests itself on the front panel as physical minicritical indicator 21A. As can be seen from FIG. 3, similar logic circuitry drives LEDs 48, 49, 50 and 51 when the values calculated for the S and I biorhythm cycles are at critical and minicritical days. Thus applicant's invention will instantly indicate to the user whether any of the calculated biorhythms are at critical or minicritical days. It will be understood by those skilled in the art that logic gates 68, 69, 72, 78, 82, 87, and 90 may be external to microprocessor 31, or implemented internally to microprocessor 31 in programmable logic array 36.

Throughout this application the following notation will be used:

YY will indicate the last two digits of a calender year in the 20th century;

MM will be a number 1–12 designating the months January through December respectively;

DD is a number 1–31 representing the day of the month.

The operation of the preferred embodiment of the present invention will now be discussed from an input-output point of view with a discussion of the algorithm to follow. The user of a biorhythm computer embodying the present invention may enter a birthdate, or the date of interest for which biorhythms are to be calculated first. For purposes of this explanation it is assumed that a birthdate is first selected. The user enters the birthdate of interest by pressing appropriate numerical keys 26 in the following format: MMDDYY. The pressing of the B1 key, 12 causes the values YYMMDD, to be written into appropriate segments of RAM 35, herein referred to as the B1 register.

Figures 4A, 4B, 4C, 5, 5A:
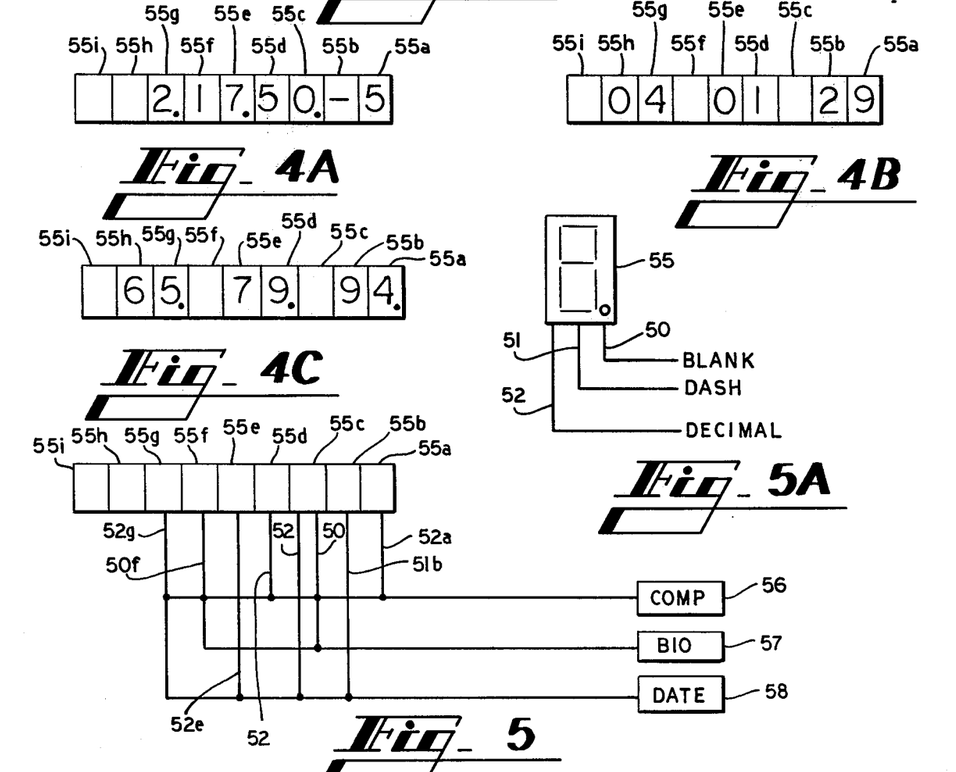
figures 4A-4C shows the displayed output of three different parameters as displayed by the preferred embodiment of the present invention.
FIG. 5 and FIG. 5A are schematic representations of the logic generating the separation indicia in a preferred embodiment.

One of the novel features of applicant's invention is the manner in which this date is displayed in the display window 22 when B1 key 12 is depressed. Reference to FIG. 4A shows the manner in which a date is displayed in the preferred embodiment of applicant's invention. The day displayed therein is Feb. 17, 1950. In the preferred embodiment disclosed herein, display 41, positioned behind display window 22, is a nine section, seven segment, vacuum flourescent display. The sections of display 41 are designated 55a–55i. As can be seen from FIG. 4A, applicant's invention displays a date entered by depressing B1 key 12 in the following format: MM.DD.YY.—WD; where "WD" is a numerical representation of the day of the week upon which the date displayed fell. The decimal points between the digits representing the month, day and year are separation indicia which greatly enhance the readability of the date displayed. As can be seen in section 55b in FIG. 4A a distinct separation indicia is used to set off the value of WD found in section 55a. In the preferred embodiment of applicant's invention a value of one for WD represents Monday and a value of seven represents the weekday Sunday. Thus it can be seen from FIG. 4A that Feb. 17, 1950 occurred on a Friday. Next the user of the biorhythm computer embodying the present invention again enters a date in the format MMDDYY and then depresses date key 11. This writes the values of MM, DD, and YY, into the date register and causes the date so entered to be displayed in display 41 according to the format previously discussed and shown in FIG. 4A. The day of the week upon which the date entered by depressing date key 11 will be displayed as previously explained.

To calculate the biorhythms for the date entered in the date register for a person born on the day in the B1 register, the user need only depress BIO key 10. The preferred embodiment calculates the three biorhythms according to the algorithm disclosed below and displays them according to the format shown in FIG. 4B. The point in each biorhythm cycle is displayed as a two digit number and the biorhythm cycles, reading from left to right, are in the order P, S, I. This corresponds to increasing length of the cycles and furthermore to the positions of the critical and minicritical indicator lights 20a–20c and 21a–21c. In the preferred embodiment of applicant's invention the display of biorhythms uses blank spaces in display 41 as separation indicia so that the values of each biorhythm may be easily and unambiguously read. This is to be contrasted with the prior art which discloses no means for selecting or generating separation indicia when the numerical values of biorhythms are displayed. As shown in FIG. 4B, the separation indicia for the display of calculated biorhythms are blank sections of the display, 55c and 55f. It is to be further noted that the separation indicia for the display of calculated biorhythms are distinct from the separation indicia of a display date; thus applicant's invention allows the user to ascertain the type of quantity displayed in display 41 by inspection.

Similarly the birthdate of interest could have been entered into the biorhythm calculator by depressing the B2 key 15 which would have written the date into the B2 register. In the preferred embodiment of applicant's invention, dates written into the B1 or B2 registers remain there until written over by a subsequent depression of the B1 or B2 keys. The depression of a B1 or B2 key sets a flag in the calculators so that whenever BIO key 10 is depressed, biorhythms will be computed on the date in the date register for a person born on the date found in the register (B1 or B2) for which key 12 or 15 was last depressed. Thus if dates are entered in registers B1, B2 and date, and the user has subsequently been using the preferred embodiment as a conventional four function calculator, if the user presses B2 key 15 and then bio key 10, biorhythms on the date in date register for a person born on the day in the B2 register will be computed and displayed.

Another novel feature of the invention disclosed herein is the ability to compute and display biorhythmic compatibility percentages for any two people. The biorhythmic compatibility percentage for person A with respect to person B for a given biorhythm cycle is the percent of the cycle for which both persons' biorhythm cycle have the same sign. Thus it can be seen that persons born on the same day will have 100% biorhythmic compatibility percentages for all three biorhythm cycles. If one considers the 28 day S cycle for a moment, it can be seen that persons born on days which differ by an even multiple of 28, will have 100% compatibility with respect to the S cycle. It can likewise be seen that persons born 14 days apart (or dates which differ by an even multiple of 28, plus 14) will have their S biorhythm cycles completely out of phase and will have a zero compatibility percentage with respect to the S cycle.

As will be obvious to those skilled in the art, the percentage of time in which two persons' biorhythms have the same sign can be calculated from the difference in the number of days between their birthdays and the number of days in each cycle. Thus to calculate the S cycle compatibility for two people, if the number of days between their birthdays is divided by 28 (the period of the S cycle) the remainder of this quotient will be the "offset" for the two peoples' S cycle. When this remainder is zero, the peoples' compatibility for the S cycle is 100%. This percentage gradually decreases toward zero as the remainder approaches 14 (a half cycle). Likewise as the remainder goes from 15 to 27 the compatibility percentage for the S cycle rises from zero toward 100%. It can likewise be seen that each day of offset corresponds to 7.1% change in the amount of these cycles which have the same sign. The corresponding percentage per day for the P cycle is 8.7% and for the I cycle it is 6.0%. These percentage per day figures for each cycle are stored in ROM 37 and used in the preferred embodiment to calculate the biorhythmic capability percentages.

With birthdates entered in B1 and B2 registers depression of C/S key 16 causes the calculator embodying applicant's invention to perform biorhythmic compatibility percentage calculations as described above and to display these percentages as shown in FIG. 4C. The example shown in FIG. 4C is generated when Feb. 17, 1950 is in one birthday register and Jan. 21, 1947 is the other birthday register. As can be seen from FIG. 4C persons born on those two days have a P biorhythm cycle that has the same sign 65% of the time; an S cycle which has the same sign 79% of the time; and an I cycle which has the same sign 94% of the time thus indicating that the two peoples' I cycle is only one day out of phase. It is to be noted from FIG. 4C that the separation indicia which the preferred embodiment of applicant's invention generates for biorhythmic compatibility percentage displays is a combination of decimal points and blank sections. The decimal points appear after the last digit of each compatibility percentage (in sections 55a, 55d, 55g) and the blank spaces appear in sections 55c and 55f.

Thus it can be seen that a novel feature of applicant's invention is that dates (either birthdays or dates of interest), biorhythms, or biorhythmic compatibility percentages are all displayed in register 41 but each quantity uses distinct separation indicia so that the user may ascertain the type of quantity being displayed.

FIG. 5 the schematic representation the drive circuitry which provides the separation indicia of the invention herein disclosed. FIG. 5A shows an individual section 55 of the nine section display 41 of the preferred embodiment. As can be seen from FIG. 5A when line 50 is in a logical one state section 55 is blanked. Likewise when line 51 is in a logical one state a dash appears in section 55 and when line 52 is in a logical one state a decimal point (in addition to any other figures generated in the seven segments) will appear. Biorhythmic compatibility percentage output 56 is a flag in programmable logic array 36 set by CPU 32 when the output being displayed is a set of biorhythmic compatibility percentages. As can be seen by connections from the output of flag 56 to lines 52a, 50c, 52d, and 52g, when a set of biorhythmic compatibility percentages are displayed sections a, d and g, will contain decimal points while sections 55c and 55f will be blank as described above. Likewise the connections from biorhythm flag 57 to the sections of display 41 correspond to the separation indicia described above as do the connections from date flag 58. It will be understood by those skilled in the art that the connection shown on FIG. 5 may be implemented as hard wired logic outputs to sections 55a–55g or may be implemented as pulsed serial outputs with the addressing logic contained internally on the same integrated circuit which holds display 41.

Figure 6A:
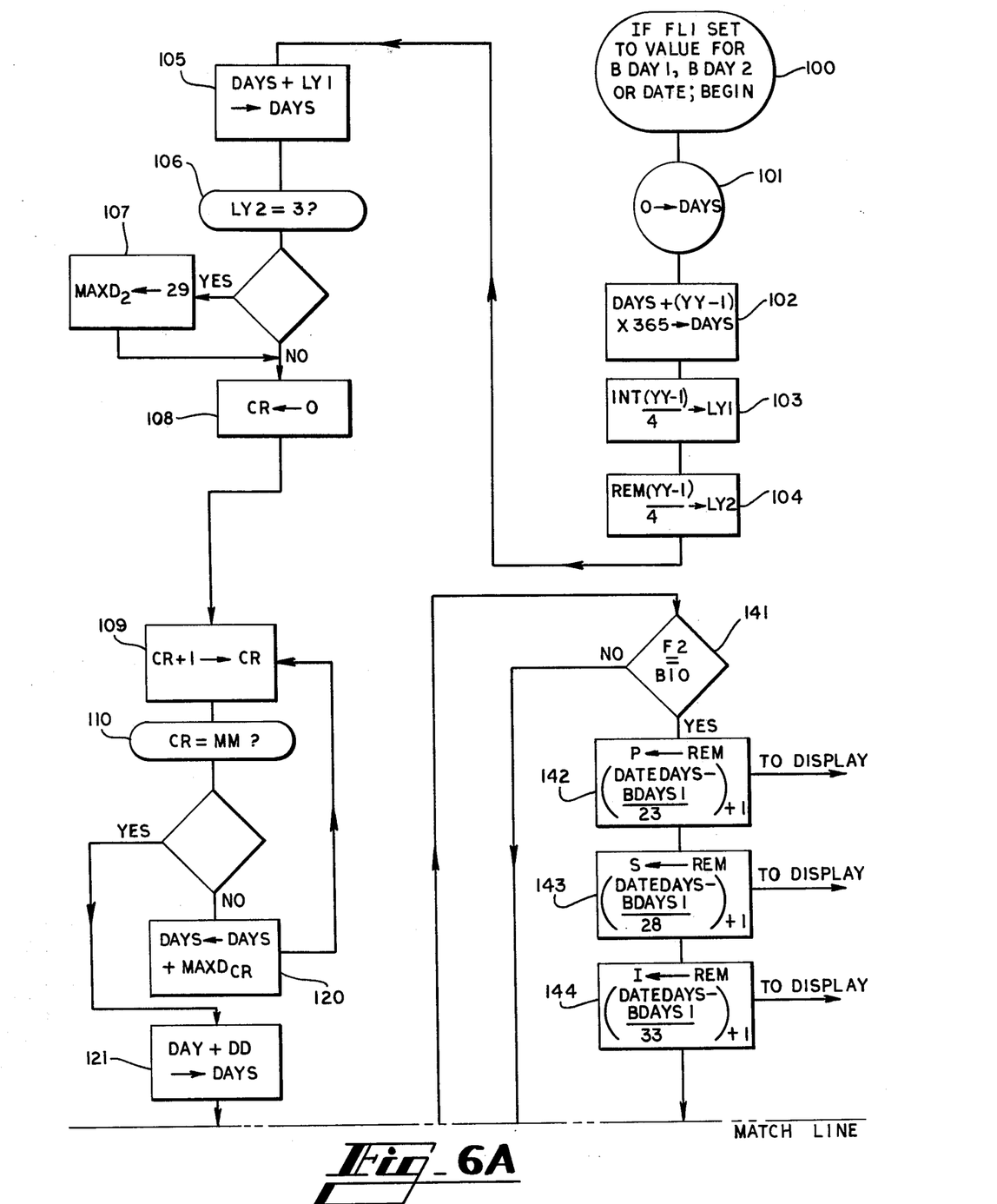
FIGS. 6A and 6B is the algorithm by which the preferred embodiment of the present invention calculates the three biorhythms, biorhythmic compatability percentages, and determines the day of the week.
Figure 6B:
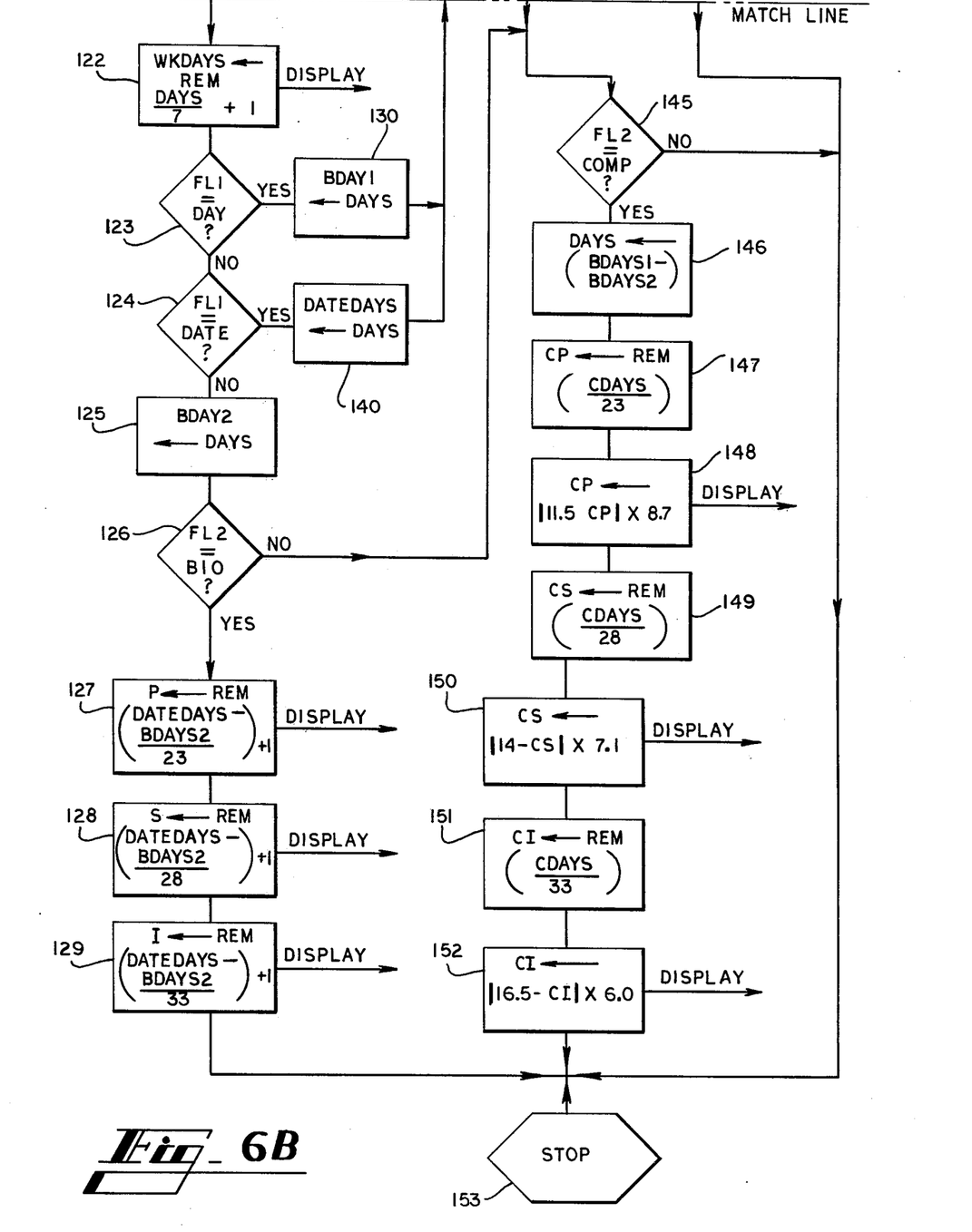

Referring now to FIG. 6 the algorithm by which the preferred embodiment of the present invention calculates biorhythms and biorhythmic compatibility percentages is shown. Much of what is shown in this algorithm will be self explanatory to those skilled in the art but a few salient features will be pointed out. In FIG. 6 the following labels are used to represent defined variables:

YY=Last 2 digits of year in the 20th century
MM=Month (01–12)
DD=Day of month
LY1=No. of leap years from birthday to date
LY2=REM(YY−1)/4
DAYS=No. of days from birthday to date, or No. of days between two birthdays
CR=a counting register
REM(x/y)=remainder of the quotient x divided by y
INT(x/y)=integer part of the quotient x divided by y
DATEDAYS=No. of days from reference date to DATE
BDAY1, BDAY2=No. of days from referece date to birthday 1, birthday 2
CP, CS, CI=compatibility percentages for the three biorhythm cycles
P,S,I=the values for the three biorhythm cycles
WKDAY=an integer (1–7) representing the day of the week
FL1, FL2=flags
$MAXD_n$=maximum No. of days in each month (n=1–12)

The reference date used in the preferred embodiment of the present invention is Jan. 1, 1901 which fell on a Tuesday. When a date is entered into the calculator by numeral keys 26 and subsequently if flag 1 (FL1) is set to either BDAY 1, BDAY 2, or date by the operator depressing key 12, 15, or 11 respectively, the algorithm begins at step 101. The algorithm shown in FIG. 6 implements the following equation for calculating the number of days from the reference date to the date entered in the format MMDDYY. DAYS=-(YY−1)×365+LY1+MAXD+DD.

The first term is added at step 102 and simply starts the DAYS count at 365 times the number of years from the reference date to December 31 of the year preceding year YY.

Next, corrections must be made for leap years. This is accomplished by steps 103–107 of the algorithm shown in FIG. 6. This correction is accomplished by computing the value of the quotient ((YY-1)/4). As can be seen from inspection of this formula, the integer part of this quotient will always be equal to the number of leap years that have preceded the year represented by YY since the reference date. Thus the value of LY1 is added to the number of days being computed in step 105 to take into account all of the February 29ths that have occurred from the reference year through the end of the year preceding the year YY. The remainder of the quotient ((YY-1)/4) will be equal to three if the year represented by YY is itself a leap year. If this is true then the branch from step 106 replaces the value for the maximum number of days in the month of February with 29. Thus if the date of interest in the year YY occurs after February the loop from steps 109–120 will add 29 days to the days count when CR equals 2. As can readily be seen from FIG. 6 the loop formed by steps 109–120 adds the number of days in each month that has already passed in the year YY until the month and then is reached. At this point the number of days (represented by DD) of interest in that month is added and the number of days from the reference date to the date of interest has been computed and stored in the register designated DAYS.

To calculate the day of the week on which the date of interest falls the calculation represented by step 122 is performed. Jan. 1, 1901 occurred on a Tuesday. It can be seen that the number of days in the DAYS register as calculated above will be evenly divisible by 7 if the date of interest occurs on a Monday. If the date of interest occurs on a Tuesday the remainder of the quotient DAYS/7 will be 1, likewise the remainder for successive days of the week will increase by one until we reach the remainder for all dates occurring on a Saturday will be 6. Thus, for any date of interest, if 1 is added to the remainder DAYS/7 an integer between 1 and 7 will be obtained to represent the day of the week upon which the date of interest fell. 1 represents Monday, 2 represents Tuesday, and so forth through 7 represents Sunday.

Steps 122, 124 and 125 respresent tests of flag 1 which will be set by the operator depressing key 12, 15, or 11. Depending on the value of the flag, the value in the DAYS register is stored in a register for the designated quantity of one of the birthdays or the DATE.

Flag 2 is then checked to see if the BIO key 10 or the C/S key 16 (commanding computation of biorhythmic compatibility percentages) has been depressed. If the BIO key has been depressed the computation of biorhythms for a person on the date of interest are performed. If the number of days from the reference date to the person's birthday is stored in BDAY 2 the biorhythms are calculated by steps 126 through 129. Likewise, if the number of days from the person's birthday to the date of interest is stored in BDAY1 the biorhythms are calculated by steps 141 through 144.

As can be ascertained from either of these sets of steps, the point in each biorhythm cycle is calculated by taking the remainder of the quotient of the number of days from the person's birthday to the date of interest divided by the period of the cycles in adding 1 to that remainder. Thus if the remainder is equal to 0, the number of days between the person's birthday and the date of interest is evenly divisible by the period of the cycle and the person is at the beginning of a new cycle for the cycle in question. The addition of 1 to this remainder simply by convention shows that when a 0 remainder is obtained from the aforementioned quotient, 1 is added to show that the person is in the first day of the biorhythm cycle. Thus for the P cycle the possible remainders are 0 to 22 and the outputs so that the person is in days 1 through 23 of the P cycle. Similar calculations are performed for the 28 day S cycle and the 33 day I cycle.

If flag 2 is set to calculate biorhythmic compatibility percentages which is done by depressing C/S key 16 on the keyboard, flag 2 is set equal to COMP as shown in step 145. The algorithm for calculating the biorhythmic compatibility percentages is steps 145 through 152 and is simply a flow chart representation of the calculation of these percentages as described previously.

Lastly the novel reverse and forward features of the present invention will be explained. The input from the keyboard for the reverse and forward functions are the R key 17 and the F key 18 respectively as shown in FIG. 1. When a biorhythm for a given date and birthdate has been computed by applicant's invention, the depression of the R key 17 or the F key 18 will move the date on which the biorhythms for the birthday in question are to be calculated backwards or forwards one day. Recall that depression of the B1 or the B2 key will set F1 equal to BDAY1 or BDAY2. It is biorhythms for the last depressed birthday key (B1 key 12 or B2 key 15) which will set FL1 to its appropriate value. Thus the depression of R key 17 causes 1 to be subtracted from the number then being stored in the DATEDAYS register and then according to the condition of FL2 the biorhythms for a person born on the day represented by the number of days in register BDAY1 or BDAY2 will then be computed. Thus it can be seen that depression of the R key will calculate the biorhythms for a person born on the flagged birthday for the day preceding the date that was entered into the calculator in the format MMDDYY when the DATE key was last depressed. Likewise depression of F key 18 adds 1 to the number of days in the DATEDAYS register and recomputes the biorhythms. Each of these functions may be done continuously so that biorhythms for a person on any number of successive days may be quickly calculated without having to reenter the date of interest each time biorhythms are to be computed.

It will be understood by those skilled in the art that other embodiments and other algorithms may be used and employed within the scope of the present invention. Accordingly, the invention should only be limited by the scope of the claims appended hereto.

What is claimed is:

1. A calculator having a keyboard, a numerical display;
    a first birthday key associated with said keyboard;
    a biorhythm key associated with said keyboard;
    a second birthday key associated with said keyboard;
    a compatibility key associated with said keyboard;
    a dedicated program for computing and storing in a first register a first numerical representation of a first date in response to selective operation of said first birthday key,
    for computing three biothythm values of a person having a birthdate corresponding to said first date and storing a numerical value for said biorhythm values in a plurality of storage registers in response to selective operation of said biorhythm key;
    for computing and storing in a second register a second numerical representation of a second date in response to said second birthday key,
    for computing a first output value definable as the product of a first percentage constant and the magnitude of the difference of one-half of a first integer constant and the remainder of the quotient obtained by dividing the magnitude of the difference of said first numerical representation and said second numerical representation by said first integer constant, computing a second output value definable as the product of a second percentage constant and the magnitude of the difference of one-half of a second integer constant and the remainder of the quotient obtained by dividing the magnitude of the difference of said first numerical representation and said second numerical representation by said second integer constant, computing a third output value definable as the product of a third percentage constant and the magnitude of the difference of one-half of a third integer constant and the remainder of the quotient obtained by dividing the magnitude of the difference of said first numerical representation and said second numerical representation by said third integer constant, in response to selective operation of said compatibility key;
    display generating means operatively interconnected with said dedicated program and said keyboard for simultaneously displaying said first output value, said second output value, and said third output value in said numerical display in response to said operation of said compatibility key,
    each of said output values being separated from adjacent output values by a first separation indicium;
    said display generating means being alternately operative for simultaneously displaying said three biorhythm values, each of said biorhythm values being separated from adjacent biorhythm values by a second separation indicium in response to said operation of said biorhythm key.

2. A calculator having a keyboard, a numerical display;
    a first birthday key associated with said keyboard;
    a biorhythm key associated with said keyboard;
    a second birthday key associated with said keyboard;
    a compatibility key associated with said keyboard;
    a dedicated program for computing and storing in a first register a first numerical representation of a first date in response to selective operation of said first birthday key,
    for computing three biorhythm values of a person having a birthdate corresponding to said first date and storing a numerical value for said biorhythm values in a plurality of storage registers in response to selective operation of said biorhythm key;
    for computing and storing in a second register a second numerical representation of a second date in response to said second birthday key,
    for computing three biorhythmic compatibility percentage values between said first numerical representation of a first date and said second numerical representation of a second date in response to selective operation of said compatibility key;
    display generating means operatively interconnected with said dedicated program and said keyboard for simultaneously displaying said three biorhythmic compatibility percentage values in said numerical display in response to said operation of said compatibility key, each of said biorhythmic compatibility percentage values being separated from adjacent biorhythmic compatibility values by a first separation indicium;

said display generating means being alternately operative for simultaneously displaying said three biorhythm values, each of said biorhythm values being separated from adjacent biorhythm values by a second separation indicium in response to said operation of said biorhythm key.

3. A calculator as recited in claim 2 wherein:

said display generating means is further operative in response to said first birthday key and alternately in response to said second birthday key for displaying a diplayed numerical representation, as a month value, a day value, and a year value, each of said month value, said day value and said year value being separated by a third separation indicium.

4. A calculator as recited in claim 3 wherein:

said dedicated program is operative to compute a first weekday numerical representation for said first date in response to said first birthday key and is alternately operative to compute a second weekday numerical representation for said second date in response to said second birthday key; and said display generating means is further operative for displaying said week day numerical representation set off from said displayed numerical representation by a fourth separation indicium.

* * * * *